United States Patent [19]
Lunetta

[11] Patent Number: 5,680,159
[45] Date of Patent: Oct. 21, 1997

[54] INTERACTIVE DISPLAY SYSTEM USING A LASER DISK PLAYER REPLAYING VIDEO FRAMES IN RESPONSE TO TOUCH FORCE CONTROL MONITOR

[75] Inventor: Donald M. Lunetta, Chappaqua, N.Y.

[73] Assignee: Interactive Sales Systems, Peekskill, N.Y.

[21] Appl. No.: 351,685

[22] Filed: Dec. 8, 1994

[51] Int. Cl.⁶ .................................................. G09G 5/12
[52] U.S. Cl. ............................................ 345/173; 345/156
[58] Field of Search .................................... 345/173, 178, 345/156, 158, 162, 184; 235/375, 381; 273/94, 55 R; 358/342, 296; 348/587; 395/600, 601; 341/20, 33-34; 178/18, 19

[56] References Cited

U.S. PATENT DOCUMENTS

| | | | |
|---|---|---|---|
| 4,644,401 | 2/1987 | Gaskins | 348/589 |
| 4,667,221 | 5/1987 | Cawley et al. | 348/587 |
| 5,226,160 | 7/1993 | Waldron et al. | 395/685 |
| 5,231,381 | 7/1993 | Dywaer | 345/174 |
| 5,235,509 | 8/1993 | Mueller et al. | 395/215 |
| 5,237,157 | 8/1993 | Kaplan | 235/375 |
| 5,250,929 | 10/1993 | Hoffman et al. | 345/146 |
| 5,262,778 | 11/1993 | Saunders | 341/34 |
| 5,351,132 | 9/1994 | Sawabe et al. | 358/342 |
| 5,369,258 | 11/1994 | Sansone et al. | 235/381 |
| 5,376,948 | 12/1994 | Roberts | 345/173 |
| 5,428,774 | 6/1995 | Takahashi et al. | 395/600 |
| 5,462,275 | 10/1995 | Lowe et al. | 273/94 |
| 5,563,632 | 10/1996 | Roberts | 345/173 |

Primary Examiner—Raymond J. Bayerl
Assistant Examiner—Martin Loui

[57] ABSTRACT

An interactive display system is described using a standard TV monitor placed on a touch position sensor. A control operates with the output touch signals from the touch position sensor to produce frame number signals that are representative of the frames stored on a laser disk. The laser disk player generates the desired video frame signals which are applied to the TV monitor to display the frames. The touch signals from the touch position sensor provide an indication of where a person has made contact with the screen of the TV monitor to thus enable the person to interact with the information in the frames stored on the laser disk in a simple and rapid manner.

4 Claims, 4 Drawing Sheets

5,680,159

INTERACTIVE DISPLAY SYSTEM USING A LASER DISK PLAYER REPLAYING VIDEO FRAMES IN RESPONSE TO TOUCH FORCE CONTROL MONITOR

FIELD OF THE INVENTION

This invention generally relates to a method and apparatus for producing an interactive display system. More specifically relates to an interactive display system for use in the promotion of goods or services in retail establishments or other businesses.

BACKGROUND OF THE INVENTION

Television is of course a well known medium through which goods and services can be promoted. Television monitors are well known and typically require so called NTSC type signals for the display of information on the television screen. NTSC signals typically involve the transmission of information that is organized in frames with successive frames being shown at a sufficiently fast pace, such as 30 frames per second, so as to provide a motion sequence.

Although a very popular medium for the source of television movies is the video tape playback/recorder, the VCR, another source that is well known is the laser disc player, the LDP. This uses laser disks which typically store video information in the form of standard video frames. The LDP is capable of reproducing the video information on a laser disk with great fidelity and thus cause the display of a bright and sharp image on a television screen. The LDP also can be controlled to display a particular frame or run a particular sequence of frames by sending the LDP appropriate instructions identifying the starting and end frame numbers of a sequence or the number of the frame of interest.

A promotional interactive system is known using an LDP with a programmed personal computer (pc) and a user interface that incorporates a mouse pointer or a touch screen or some other pointing device. The pc is programmed to generate an appropriate screen which can have one or more active areas. When anyone of these areas is touched or pointed to, the program responds with a signal representative of the location and thus the menu item pointed to. The signal is converted by the pc to an output signal that is applied to an LDP to cause the latter to display a frame or a sequence of frames on another screen of a standard TV monitor. The standard pc is generally constrained in screen size in comparison with TV type screens.

Such a promotional interactive system has several disadvantages in that it requires the use of a second video monitor and the use of a digitally programmed pc to generate and display the required graphics. The generation of a digital graphic panel tends to introduce some delay and this added to the small delay inherent with an LDP before it causes a display of a frame might affect the attention span of a casual shopper seeking to use the system for information about a product. The use of a mouse or similar pointing device by the public also tends to lead to problems such as damage from wrong use or confusion. After all, despite the widespread use of computers and mice there are many in the public who do not find such devices very friendly.

SUMMARY OF THE INVENTION

It is, therefore an object of the invention to provide a method for interactively displaying information or promoting goods or services and an interactive display system which is quite friendly to use, provides crystal clear displays of merchandise and other promotional material and is very sensitive to a user's touch to display the desired information and is relatively inexpensive to deploy in multiple numbers throughout a store or other organization.

This is achieved with one technique in accordance with the invention by employing a standard television monitor and placing this on top of a strain gauge sensor capable of generating touch signals indicative of the place of screen contact of a person. The touch signals are then converted by a control, in accordance with a prescribed program, into frame signals representative of the frame numbers of video frames recorded on a laser disk and to be played back for display on the same standard TV set.

With an interactive display in accordance with the invention the advantage of clarity of signals obtainable with an LDP is preserved, the delays, complexities and expense inherent with a digital interactive system are avoided and a highly appealable promotional environment is created.

It is, therefore, a further object of the invention to provide an interactive display system wherein the screen size is not limited and a large TV screen can be used and wherein the display does not encounter image degradation and pixel artifacts as well as dithering effects associated with the use of compressed digital video from computer oriented displays.

These and other advantages and objects of the invention can be understood from the following detailed description of the drawings.

DETAILED DESCRIPTION OF THE DRAWINGS

Figure 1:
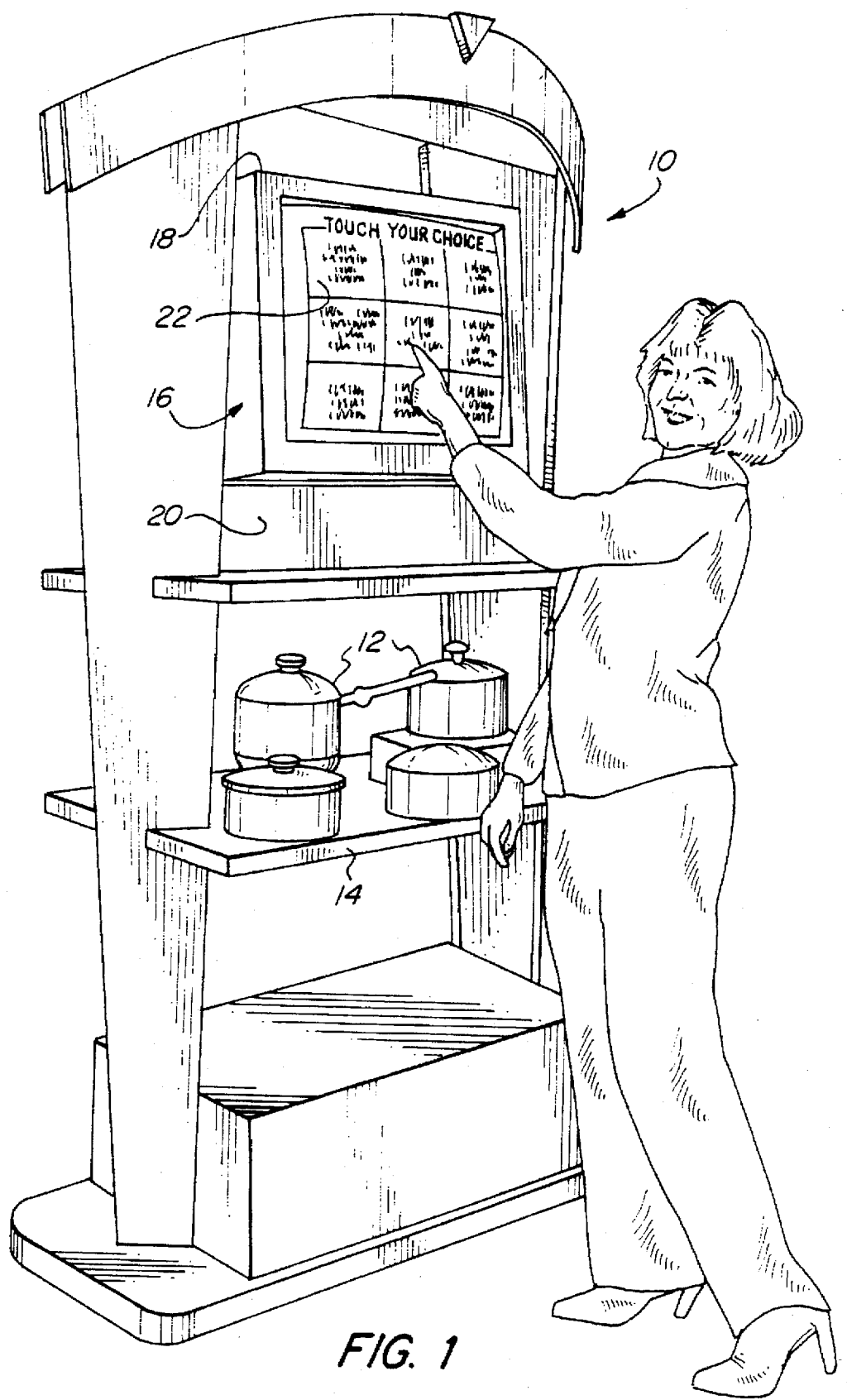
FIG. 1 is a perspective view of an interactive display system in accordance with the invention.

With reference to FIG. 1 a kiosk 10 is shown in which products such as the pots and pans 12 to be promoted are displayed on shelves 14. An interactive display system 16 in accordance with the invention is shown formed of a TV monitor 18 mounted on a touch position sensor 20 of a particular strain gauge type capable of producing touch signals representative of where the person in FIG. 1 touches screen 22 of the TV monitor 18.

Figure 2:
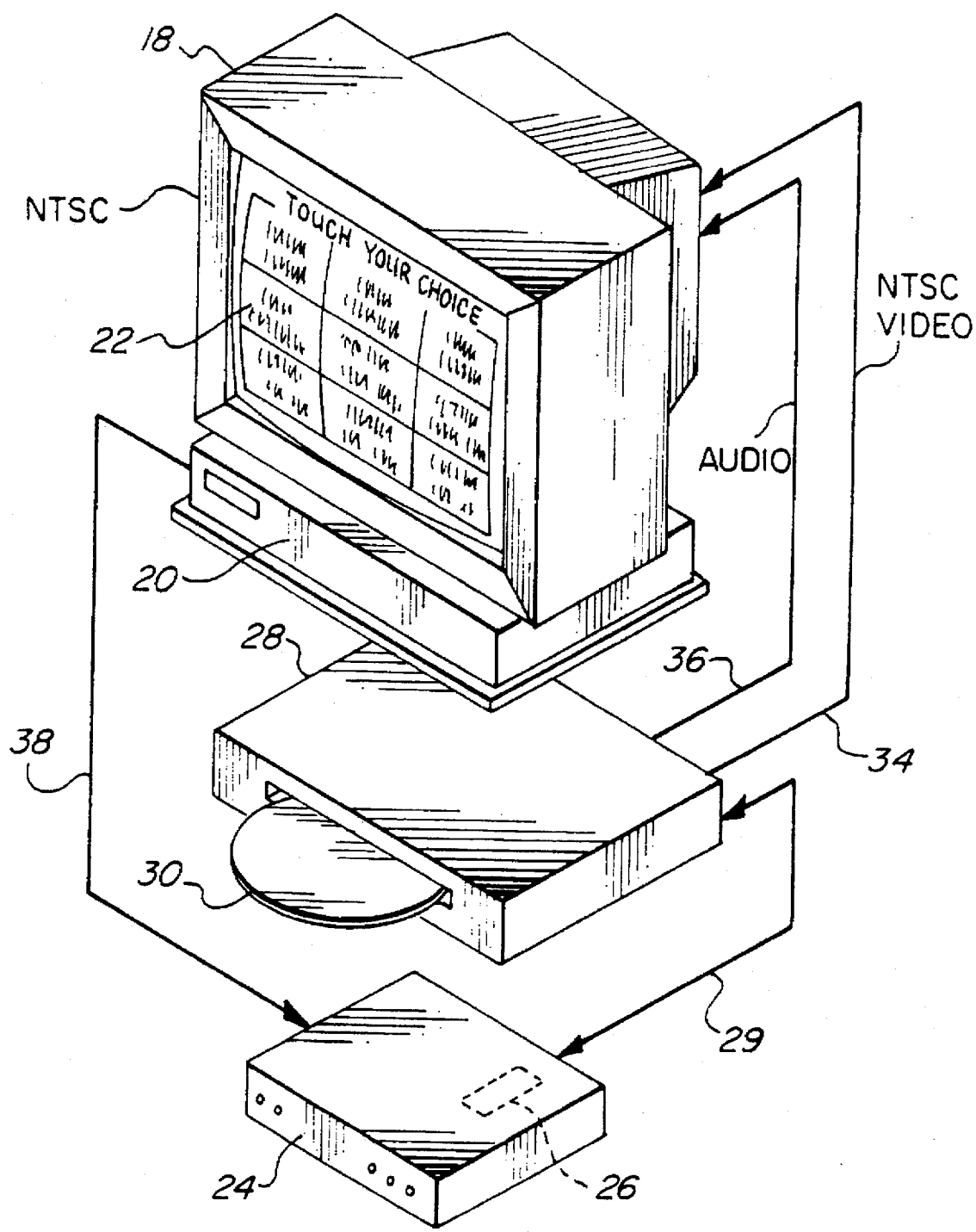
FIG. 2 is an enlarged exploded perspective view of the interactive display system of FIG. 1.

As shown in FIG. 2 the touch signals are applied to a control 24 which includes appropriate electronics 26 to provide conventional two way communication with laser disk player 28 in accordance with the touch signals from the position sensor 20. The program recorded on a laser disk 30 is displayed by the LDP using standard TV format signals known as NTSC format. Other conventional formats can be used. The principal aspect of the laser disk and the LDP is that the information is stored in frames and that the frames can be accessed using frame number signals as produced by the control 24. The outputs from the LDP are video signals on a line 34 and associated audio signals on line 36 with both lines being applied to appropriate video and audio inputs respectively of the TV monitor 18.

Laser disk 30 has a program of video and audio recorded thereon using well known recording techniques. The program can be accessed by sending individual starting and ending frame instructions from control 24 which also receives appropriate return signals from the LDP such as the detection of the end of a requested sequence and the like. The communications between the LDP 28 and the control 24 employs an RS-232 type interface along a line or suitable cable 29. Different LDPS' can be used such as the Pioneer LD-V4400.

The touch position sensor 20 is a device such as made by the Microtouch Systems, Inc. of Methuen, Mass under the name the Visage Touchmate, a trademark of the Visage, Inc. The touch position sensor 20 operates by sensing a person's direct light touch on the TV monitor screen 22 and producing from that contact a signal indicative of where on the screen that touch occurred. It is only required for the TV monitor 18 to be balanced on the touch position sensor 20 and to initially undertake a calibration of this arrangement in accordance with available published instructions. The output touch signals from the sensor 20 are provided on line 38 and are applied to the control 24. Since the touch sensor 20 is quite sensitive, cables such 34, 36, and 38 are carefully routed and fixed in position so as to enable the calibration step to take these into account and avoid their influencing the output.

Control 24 includes appropriate microprocessor capability to receive the touch signals and convert these to frame number signals for output to the laser disk player 28. Since the frame numbers relate to a particular laser disk 30, the control preferably is provided with a replaceable EPROM stored with data associated with a particular laser disk program to convert the touch signals to frame number signals. The control, therefore, includes sufficient CPU capability for handling the input signals from the touch position sensor 20 and communicate with the LDP.

Figure 3:
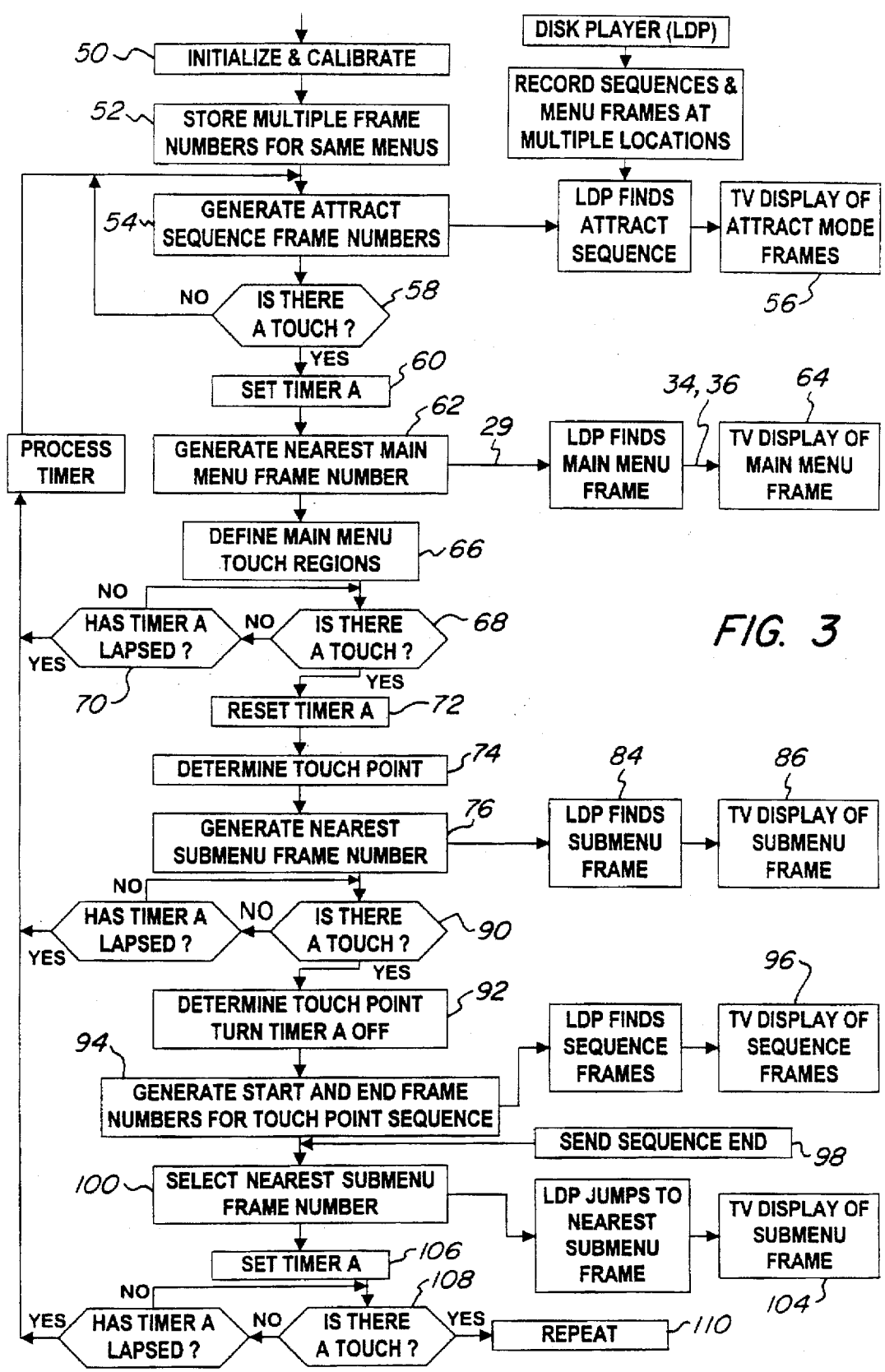
FIG. 3 is a flow chart of program steps in a control for operating with a laser disk in the interactive display system of this invention.
Figure 5:
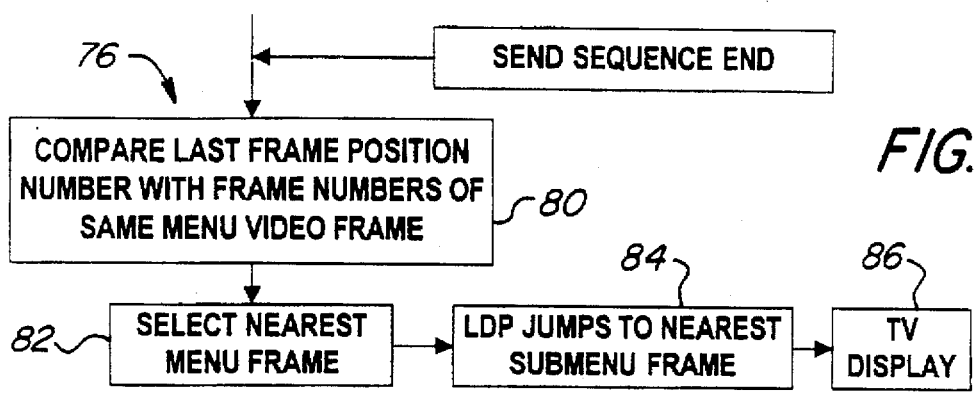
FIG. 5 is a flow chart for steps in a program for reducing the LDP's time to find a menu to be displayed.
Figure 4:
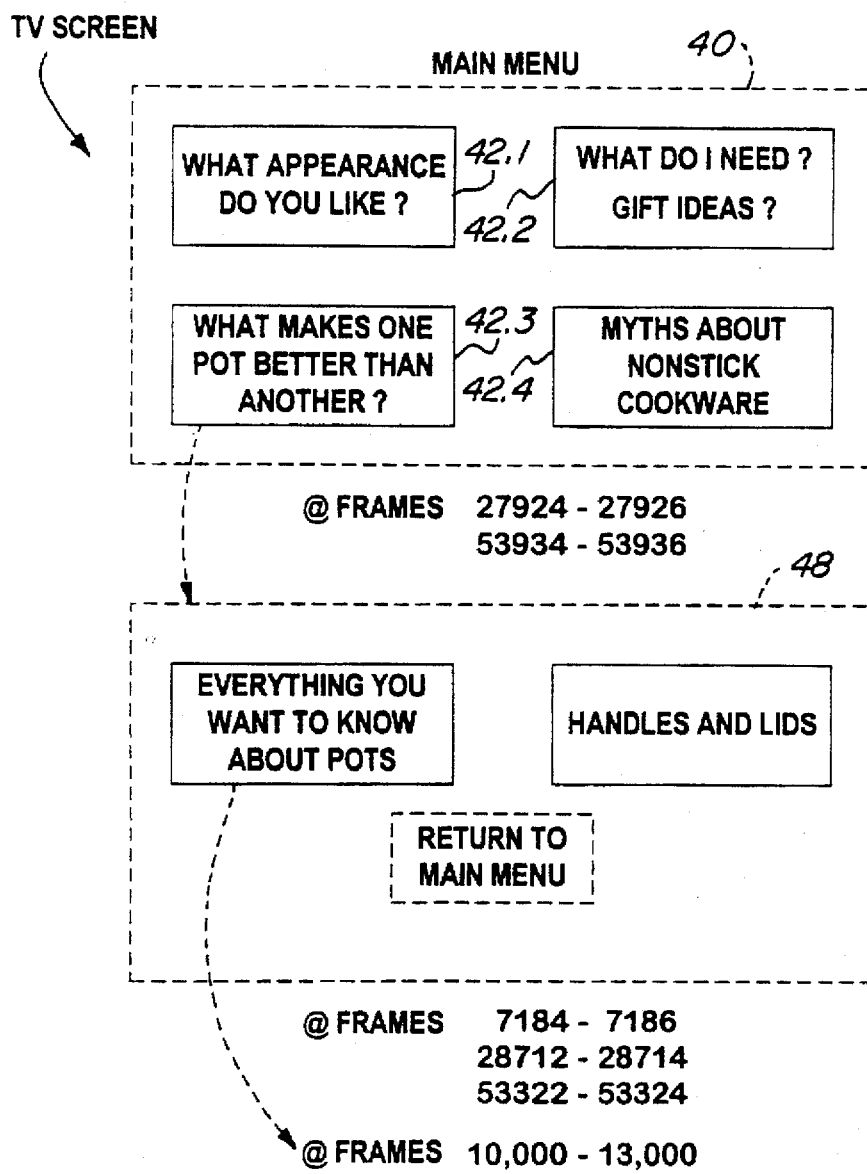
FIG. 4 is diagrammatic view of menus used in one operation of the interactive display system of this invention with a laser disk bearing a various still frames and sequences for a product promotion.

FIGS. 3, 4 and 5 are illustrative how a control 24 functions with program recorded on a laser disk 30. A laser disk product promotion program for example commences, when at rest, i.e. when there is no contact with the TV screen 22, to display an attract mode. This can be a single frame or an automatically repeatable sequence both of which could, for example, request a passerby to touch the screen. As soon as a person does so by touching at any place, a main menu screen 40 is displayed.

The main menu 40 can, for example, display a multiple number of choices 42.1–42.4 or more and these represent sub-menus that lead the person to more specific information. As soon as a person touches an area defined by a sub-menu box, such as 42.3, a sub-menu 48 is displayed. This in turn may provide the user with additional choices for display and these usually are sequences where a particular characteristic of the products, such as pots and pans, is demonstrated.

Starting at step 50 in FIG. 3 the control 24 is initialized and calibrated. Part of this step involves the touch position sensor calibration as is well known for such device. At 52 multiple frame numbers for the same menu are stored. These different frame numbers allow the same menu on a laser disk to be accessed from any position on the disk within a maximum permissible time. At 54 the attract sequence is commenced by sending sequence frame numbers from the control to the LDP. This then displays the attract mode on the TV monitor 18 at 56. At 58 the control 24 enters a loop to determine whether a physical contact has occurred with the TV screen 22. Since the attract mode is being demonstrated, the entire screen 22 is live, i.e. a contact anywhere on the screen 22 is interpreted as a request to display the main menu 40.

A touch is identified because the output on line 38 from the touch position sensor is not at the calibrated rest value. At 60 a timer is set to enable the control 24 to limit the time to select the next frame or sequence for display. At 62 the control determines the nearest location, i.e. the nearest frame number to the frame number associated with the end of the attract sequence and outputs that frame number on line 29 to the LDP 28 as a command for the LDP to display that frame. The LDP 28 then outputs the video associated with the main menu frame for display at 64.

The main menu is, therefore, distributed on a laser disk 30 at spaced apart locations. These are identified as frames 27,924 through 27,926 and frames 53,934 through 53,936. Each spaced location for a menu frame being composed of three frames in order to assure that the LDP will indeed display the correct frame when instructed to do so by control 24. Since a laser disk typically can store some 54,000 frames there are usually enough frames to enable such redundant storage as well as the distributed storage of menu frames. Sequences, however, each use too many frames to enable such redundancy. A key advantage from the distributed storage of a number of menu frames, is a shortening of the time needed to access any one submenu or main menu and cause it to be displayed when so requested by a user at the interactive display screen 22.

The control 24 is programmed to recognize as illustrated in FIG. 4 that the main menu, when displayed on the TV screen 22, has a certain number of touch sensitive areas whose shapes and sizes are predetermined. Hence, when a touch is made to area 42.1 for a submenu the touch signals generated thereby can be identified and cause the control program to jump to the frame numbers associated with that submenu.

Hence, when the main menu is displayed at 64, the touch areas for the main menu are determined at 66 and a loop 68 is entered to check whether a touch is made on the display of the main menu. If no touch occurred a check is made at 70 whether the timer set at 60 has lapsed and if not a return is made to step 68. In the event the timer had lapsed the program returns to the top of the program at 54 where an attract sequence is displayed.

When a touch on the screen showing the main menu occurs the timer A is reset at 72 and at 74 the program determines where on the screen 22 a touch has occurred. Since the main menu touch areas define sub-menus and these do not require more than one frame or three frames for redundant storage, the program at 76 quickly determines which is the nearest location for the requested menu frame.

FIG. 5 is illustrative of how the nearest menu frame number can be determined. At 80 a comparison is made of the last frame position of the LDP with the distributed frame numbers of the menu frame and the frame that yields the least difference is selected as the nearest frame at 82. The LDP is then commanded at 84 to display the nearest menu frame and this is displayed at 86.

Assuming that the submenu being displayed includes sequence choices as illustrated in FIG. 4 at 48, the program continues at 90 to determine whether a touch has occurred and on the same basis as for the main menu, determines at 92 from the touch signals which submenu area and thus which sequence needs to be displayed. If the area touched were for instance 49.1 then the control 24 converts the touch signals that fall within the area bounded by the area 49.1 into a set of frame sequence instructions. Thus, for example, a starting frame number, which could be 10,000, as well as the end frame number, which could be 10,300, are generated at 94 and sent to the laser disk player for a display of the sequence at 96. As a result a 10 second motion display is generated on the TV screen 22 at a rate of 30 frames per second.

Upon completion of the display of the sequence the laser disk player returns at 98 an end sequence signal to control 24. This then responds at 100 with a determination of the nearest of the menu frame numbers for the submenu frame 48. These are as shown in FIG. 4 distributed at three different distributed locations, namely, from frames 7184 to 7186, 28,712 to 28,714 and from 53,322 to 53,324. The nearest frame number is then sent to the LDP which responds by again causing a display of the submenu at 104.

The timer is then reset at 106 and a loop is entered at 108 to await a touch within the interval of the timer. In this manner the various menus on the laser disk 28 can be explored and displayed by a user who may interact with the screen 22 as seems appropriate by repeating some of the steps at 110 as described above.

Although menu driven displays are not novel with a system of this invention the clarity of the presentation provided by the laser disk display, the convenience from the direct touchability of the display to reach specific areas of interest and the speed with which the desired information is presented cooperate to provide an effective sales tool. It has been found that a kiosk as shown in FIG. 1 has been quite effective in communicating information to the public about diverse products and an increase in sales of the general category of products to which the kiosk relates has been found to occur.

Having thus described one form of the invention its advantages can be appreciated and variations of the described embodiment may be adopted by one skilled in the art without departing from the scope of the invention as set forth by the following claims.

What is claimed is:

1. An interactive display system, comprising:
   a conventional television monitor having a television screen requiring standard video format of a type employed in conventional broadcasting for display of video frames;
   electronic scale means physically supporting the conventional television monitor to generate touch signals representative of the occurrence and location of a person's contact with the television screen while it is supported by the electronic scale means;
   laser disk player means for reproducing audio signals and standard video format signals representative of standard video format frames recorded on a laser disk and being played back in the laser disk player;
   control means coupled to receive the touch signals and coupled to the laser disk player for sending command signals to the laser disk player and receiving command signals therefrom;
   said control means including means for converting said touch signals to frame signals representative of the frame numbers of standard video format frames located on the laser disk;
   said frame signals being coupled to an input of the laser disk player to regulate the playback of the laser disk in the laser disk player so as to generate standard video format frames stored on the laser disk for display on the conventional television monitor; and means for coupling the standard video format frames from the laser disk to the conventional television monitor for a high quality display thereof.

2. The interactive display system as claimed in claim 1 wherein said control means further includes:
   means for storing multiple frame numbers associated with the same video frame stored at spaced-apart frame locations on the laser disk;
   means for comparing the number of the video frame currently being played back with the stored multiple frame numbers; and
   means for selecting the frame number which is nearest the video frame currently being played back for display of the associated video frame.

3. The interactive display system as claimed in claim 1 and further including:
   a laser disk bearing recordings of a plurality of video frames, selected video frames forming sequences commencing and ending at predetermined frame locations and corresponding to options displayed in respectively different television screen areas;
   said laser disk further having recorded thereon different video frames corresponding to different menus, selected menus including a plurality of said options, and further having recorded thereon at distributed laser disk locations a plurality of like video frames for displaying of the same menu; said like video frames being distributed so as to reduce laser disk player access time thereto within a desired interval following contact by a person with the television screen to select an option for display on said television screen by said conventional television monitor.

4. A method for providing an interactive display for assisting in the sale of products comprising the steps of:
   providing a conventional television monitor having a television screen requiring standard video format of a type employed in conventional broadcasting for display of video frames;
   while physically supporting the conventional television monitor on a scale sensing device, sensing the occurrence of a physical motion of the conventional television monitor from a person's physical contact with the television screen and determining the screen location of the person's contact from the physical motion produced by the physical contact and producing touch signals indicative of the physical contact and its location on the television screen;
   converting the touch signals to frame signals representative of the location of standard video format frames recorded on a laser disk operatively-located in a laser disk player;
   controlling the laser disk player so as to cause it to play back the standard video format frames associated with the frame signals derived from converted touch signals; and
   displaying the played-back standard video format frames from the laser disk on the conventional television monitor for a high quality display thereof on the television screen.

* * * * *